(12) United States Patent
Mah (10) Patent No.: US 6,808,288 B2
(45) Date of Patent: Oct. 26, 2004

(54) FARADAY FLASHLIGHT

(76) Inventor: Pat Y. Mah, 8C Leroy Plaza, 15 Cheung Shun Street, Cheung Sha Wan, Kowloon, Hong Kong (CN)

(*) Notice: Subject to any disclaimer, the term of this patent is extended or adjusted under 35 U.S.C. 154(b) by 22 days.

(21) Appl. No.: 10/392,657

(22) Filed: Mar. 19, 2003

(65) Prior Publication Data

US 2003/0184997 A1 Oct. 2, 2003

Related U.S. Application Data (63) Continuation-in-part of application No. 10/112,848, filed on Mar. 29, 2002.

(51) Int. Cl.[7] .................................................. B60Q 1/00
(52) U.S. Cl. ...................................... 362/192; 362/205
(58) Field of Search ............................... 362/192, 193, 362/202, 205

(56) References Cited

U.S. PATENT DOCUMENTS

| | | |
|---|---|---|
| 3,100,292 A | 8/1963 | Warner |
| 3,129,347 A | 4/1964 | Tognola |
| 3,149,254 A | 9/1964 | Carter |
| 3,453,573 A | 7/1969 | Kyle |
| 3,696,251 A | 10/1972 | Last et al. |
| 3,736,448 A | 5/1973 | Hebel, Jr. |
| 3,933,535 A | 1/1976 | Becker |
| 3,984,707 A | 10/1976 | McClintock |
| 4,114,305 A | 9/1978 | Wohlert et al. |
| 4,140,932 A | 2/1979 | Wohlert |
| 4,605,994 A | 8/1986 | Krieg |
| 4,680,682 A | 7/1987 | Parker |
| 4,709,176 A | 11/1987 | Ridley et al. |
| 4,777,582 A | 10/1988 | Sharrah |
| 4,803,605 A | 2/1989 | Schaller et al. |
| 4,870,550 A | 9/1989 | Uke |
| 5,008,575 A | 4/1991 | Ishimoto et al. |
| 5,347,186 A | 9/1994 | Konotchick |
| 5,578,877 A | 11/1996 | Tiemann |
| 5,975,714 A * | 11/1999 | Vetorino et al. ............ 362/192 |
| 6,220,719 B1 * | 4/2001 | Vetorino et al. ............ 362/192 |

FOREIGN PATENT DOCUMENTS

| | | |
|---|---|---|
| JP | 5129781 | 3/1976 |
| JP | 55105902 | 8/1980 |
| JP | 58113202 | 8/1983 |
| JP | 9-82104 | 2/1991 |
| JP | 1830599 | 7/1993 |

OTHER PUBLICATIONS

News group thread (Jan. 11–26, 1996) Sci. Electronics. Basics Sci. Electronics, Sci. Electronics.Misc, Sci.Electronics.Equipment.

* cited by examiner

*Primary Examiner*—Laura K. Tso
(74) *Attorney, Agent, or Firm*—Curtis L. Harrington

(57) ABSTRACT

A light generating flashlight system device utilizes a large centrally located magnet which is mounted to slide past a magnet pickup or current induction wire which may be preferably mounted at a center point of travel in a tubular housing having a tubular chamber through which the magnet travels. A pair of elastomeric dampers are located each at the end of a support system sleeve which is sized to fit within a main housing to stabilize all internal support within a sealed unit. The result is a device which both facilitates the manual movement of the flashlight body so that the magnet slides past the center magnet pickup or current induction wire, and also conserves the residual momentum of the magnet once it has traveled past the magnet pickup or current induction wire by providing a bumper and spring to conserve some of the mechanical energy going in the other direction. Ninety second of manual activation enables about five minutes of illumination. A ready charger is disclosed which uses induction to charge the flashlight system by proximity to the manual charging magnet wire.

22 Claims, 8 Drawing Sheets

FARADAY FLASHLIGHT

This is a continuation-in-part of co-pending U.S. patent application Ser. No. 10/112,848 filed Mar. 29, 2002.

FIELD OF THE INVENTION

The present invention relates to improvements in the technology relating to inexpensive and reliable lighting sources and more particularly to a human powered flashlight free of batteries and free of external integrity breaches and which is engineered to use light efficiently.

BACKGROUND OF THE INVENTION

Production of light with a portable light source or flashlight is a well known expedient in which a tubular body is fitted with a number of series connected batteries. The disadvantages of conventional flashlights with this conventional configuration are generally (1) breach of internal external integrity from having to access the battery compartment fairly regularly to replace batteries, and (2) other breaches of external integrity associated with light bulb changes at the front of the device and from a mechanical linkage relating to the on and off switch.

In some devices especially built for underwater use, a series of multiple "o" rings may be employed for water sealing. However, when these structures are employed at points likely to be repeatedly accessed, such as the rear entrance to the battery compartment, degradation will likely occur resulting in an eventual breach of sealing integrity.

Other step have been taken to insure integrity such as placing a flexible push button cover over the on and off switch, but these covers tend to either leak early in their functional life at the ring of circular attachment, or later in their functional life by cracking or punching breach. Seals around the bulb changing entrance, typically the front lens cover have proven to be more secure.

Production of energy for lighting using generator devices are also known. In some cases a crank generator is provided with the crank extending through the housing, creating another source of housing fluid breach. Either a scientifically closely toleranced bearing must be provided to keep moisture out (close tolerance along with friction loss) or the generator must itself be water proof. The generator is itself a complex mechanical machine and also prone to water damage, rust, and excessive wear.

Because of the breakdowns cited above, non-battery flashlights are generally unreliable as an emergency or long storage time period source of lighting, and particularly in a harsh or moist environment.

Further, the majority of personal lighting products are generally inefficient as being operated using an incandescent (heated filament) light source which is not conserving of energy usage per unit of illumination. Most generator models require considerable hand crank input to effect any significant light output over time.

What is therefore needed is a more compact, more isolated source of emergency lighting which is human powered, but which is also efficient in operation. The device should be impact resistant and have relatively few moving parts and no intense, high force, small area wear surfaces.

SUMMARY OF THE INVENTION

The light generating device of the present invention utilizes a large centrally located magnet which is mounted to slide past a magnet pickup or current induction wire which may be preferably mounted at a center point of travel in a tubular housing having a tubular chamber through which the magnet travels. A pair of elastomeric bumpers are located each at the end of the tubular chamber. Each of the elastomeric bumpers are supported by its own spring secured against the sides, end or both of the terminal ends of the tubular chamber. The mounting sequence is first chamber end or structure to first spring, to first bumper to freely slidable or translatable magnet to second bumper secured by second end or structure of the chamber. The result is a device which both facilitates the manual movement of the flashlight body so that the magnet slides past the center magnet pickup or current induction wire, and also conserves the residual momentum of the magnet once it has traveled past the magnet pickup or current induction wire by providing a bumper and spring to conserve some of the mechanical energy going in the other direction.

Where the size of the magnet is matched to the length of the tubular chamber and the size of the springs, a matched, sealed mechanical system is formed which can be continuously operated with minimal wrist energy. The mechanical input energy is intended to be stored regardless of whether the light is operational during charging or not. The energy consumption of the lamp should be such that the mechanical charging action can keep sufficient energy stored in advance of its consumption in light production so that the flashlight of the invention can be continued to be utilized even when any temporary store of energy provided is depleted. This action is contemplated to be performed by shaking the flashlight several times to input mechanical and then electrical energy into storage, followed by a period of illumination from an energy reservoir, which may be chemical or capacitor or other.

In addition, an activation switch for external control is had with an external smaller magnet which operates in conjunction with a reed switch to enable mechanical activation without the necessity to form a mechanical linkage between the inside and outside of the flashlight.

One appliance which can greatly expand the capabilities of the flashlight of the invention is a charger which uses inductive energy transfer. Ordinary chargers rely upon physical touching of contacts and the corresponding external corrosion possibilities, as well as the possibility of non-contact with the outside energy source. Because the flashlight of the invention is completely sealed, inductive charging offers secure charging and no possibility of lack of charge through loss of physical contact.

With a charge system, the flashlight is ready to go, ready to be employed in lighting on a moment's notice. A further addition is a paralleling of the on and off switch to be activated by an electromagnet in a charger housing especially in the case of power failure. Since the flashlight unit is self contained, a cessation of charging will not result in drain of the stored power. Further, a relay which operates to switch the flashlight on will enable its use as an emergency light to enable a user to find it and use it, and to handily pluck it from its charger and exit the building if needed. The flashlight can also be switched on while in the charger, to enable it to act as a continuously charged, fixed location night light, as well as a portable night light.

The charger uses an induction system which has a physical realization matching the coil used in the charging system of the flashlight. Proximity to the charger, and its charging coil or proximity to the electromagnetic field produced by the charger will result in charging. As a result, the structure of the charger is not particularly constrained. A wall plug-in unit which is supported by an outlet and which further supports the flashlight is preferred, but a modular charger which has a wall transformer and a connected sleeve would also work well. The former enables deployment at various outlets in a room, while the latter enables more specialized orientation and deployment.

BRIEF DESCRIPTION OF THE DRAWINGS

The invention, its configuration, construction, and operation will be best further described in the following detailed description, taken in conjunction with the accompanying drawings in which.

DETAILED DESCRIPTION OF THE PREFERRED EMBODIMENT

The description and operation of the invention will be best initiated with reference to FIG. 1 and which illustrates a Faraday flashlight which will hereinafter be referred to as a flashlight 11. The external appearance of the flashlight 11 discloses two portions, a main housing chamber 13 portion and a front cap 15 portion which is separated from the main housing chamber 13 portion by a dividing line 17. Front cap 15 portion may include a combination or unitary clear cap which includes a threaded engagement portion and integral lens. In the version shown in the figures, a lens will be shown to be separate from the engagement portion of the cap, but this is just one possible variation. At the rear of the main housing chamber 13 is a protruding lug 19 having an opening 21 which is not immediately visible in FIG. 2, but which is indicated by arrow. An upper flattened portion 25 and a lower flattened portion 27 are seen in FIG. 2. An expanded portion 29 of the main housing chamber 13 is seen as meeting front cap 15 at the dividing line 17.

At the top of the flashlight 11 an attached switch assembly 31 is seen as having an attached saddle 33 which overlies the cylindrical outer surface and a slide member 35 which has retaining members (not shown in FIG. 1) which fit within the saddle 33. The whole of the switch assembly 31 may be mounted to the main housing chamber 13 by gluing, fusion, or the like. Switch assembly 35 acts by virtue of movement of a magnet within slide member 35 to a point over a portion of the housing chamber 13 at which a reed switch (not shown in FIG. 1) is located, and in order to close the reed switch by proximity of such magnet. It should be noted that the orientation of the flashlight 11 is such that the internals are protected from water and moisture, including the magnet wire 63 and magnet 65. Magnet 65 typically may have a strength of N35, and the magnet wire 63 may have about 1600 turns. About 1.3 watt can be generated for each passage of the magnet 65 through the coil of magnet wire 63.

However, it is contemplated that the magnet 65 could be made to be external to the main housing chamber 13, while the magnet wire 63 may be internally or externally located. Further, rather than simple movement of a straight tubular shaped main housing chamber 13, the movement of the magnet 65 could be effected by other mechanical and configurational structure.

As will be seen, the portion of main housing chamber 13 over which the saddle 33 is positioned may provide an accommodation space or depression to better accommodate saddle 33 and especially to protect its becoming dislodged upon external applied force, especially force along the main housing chamber 13.

The front cap 15 is shown as being supplied with a series of indentations 39 which provide not only a decorative effect, but approximate a spacing for finger and hand manipulation. The flashlight 11 is intended to be waterproof, shockproof, and to generally never need servicing as it lacks any sort of bulb which could burn out. It uses a light emitting diode which is shockproof and is not generally expected to be changed. Indentations 39 may also assist machine placement of the front cap 15 consistently to a pre-determined torque in order to provide maximum sealing while minimizing the chance of overrunning the threads of attachment. Also seen is an end surface 41.

Figures 1, 2, 3:
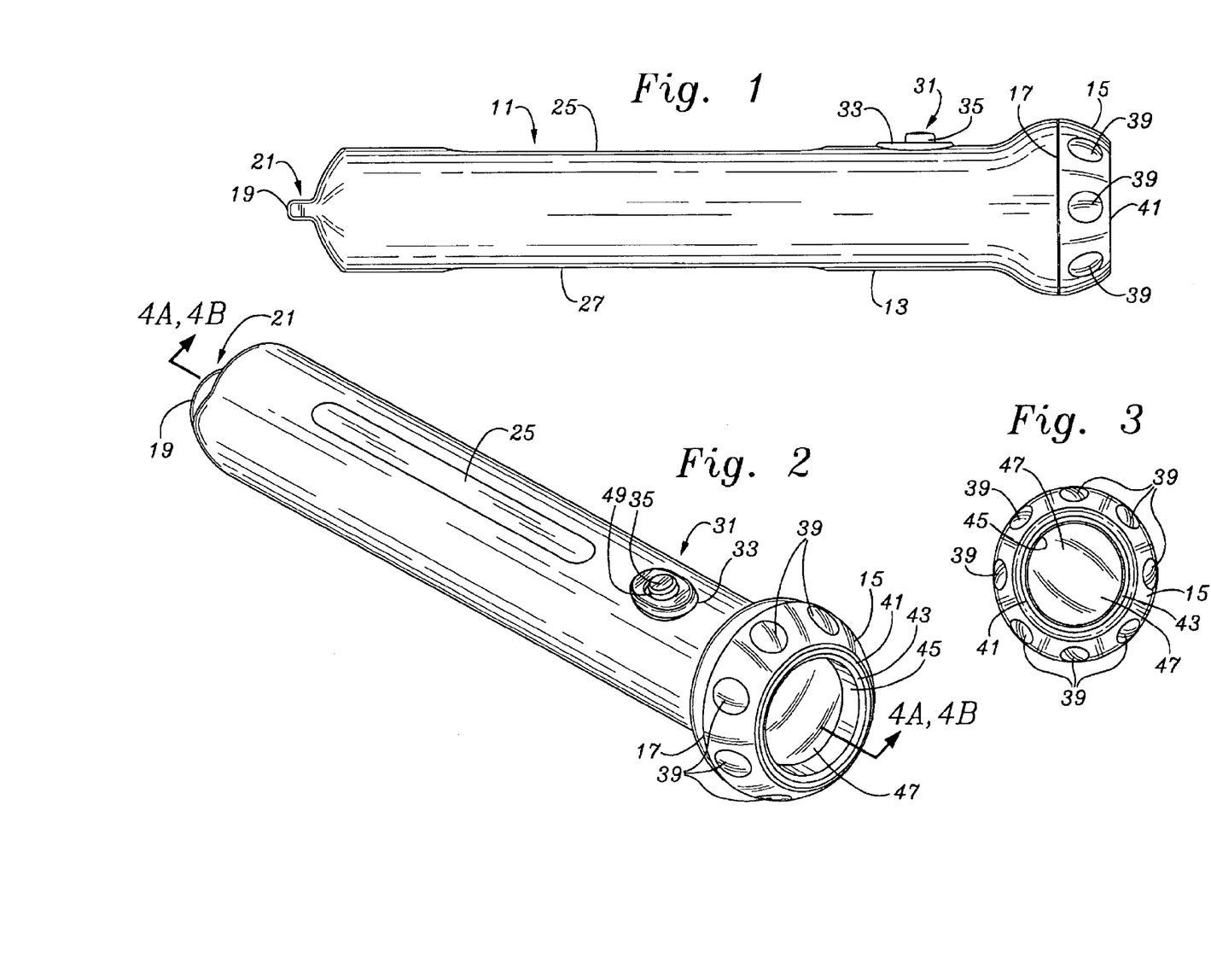
FIG. 1 is a side view of the Faraday flashlight of the present invention.
FIG. 2 is a perspective view of the Faraday flashlight as seen in FIG. 1 looking toward the front end.
FIG. 3 is a front view of the Faraday flashlight seen in FIGS. 1 and 2.

Referring to FIG. 2, a perspective view of the flashlight 11 as seen in FIG. 1, but looking toward the front end, illustrates further details within the cap 15. Just within cap 15, and beyond the end surface 41 is an angled surface 43. Just beyond angled surface 43 is an inner cylindrical surface 45. Adjacent the inner cylindrical surface 45 is a curved lens 47. As will be seen, sealing will occur behind the curved lens 47 and the arrangement of structures is such that any moisture or water which enters the dividing space or dividing line 17 still must negotiate the seal behind the curved lens 47 in order to have an opportunity to further invade the inner workings of flashlight 11. Also seen immediately to the rear of slide member 35 is a slide space 49 which defines the limits over which the slide member 35 may travel. In the configuration of FIG. 2 this is seen as allowing a forward and rearward motion along the main housing chamber 13 body, but an arrangement for side to side movement can be made.

Referring to FIG. 3, a front view of the Faraday flashlight 11 seen in FIGS. 1 and 2 illustrates the orientation of structures already covered in detail, as well as the visual effect of a main housing chamber 13 having an expanded portion 29.

Figure 4A:
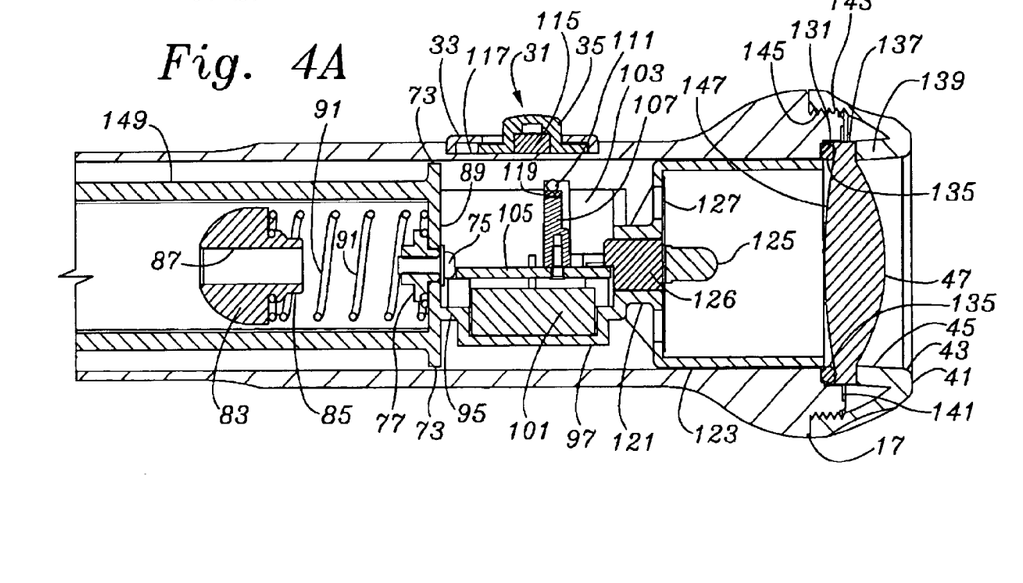
FIGS. 4A and 4B are expanded views of a section taken along line 4A and 4B of FIG. 2.
Figure 4B:
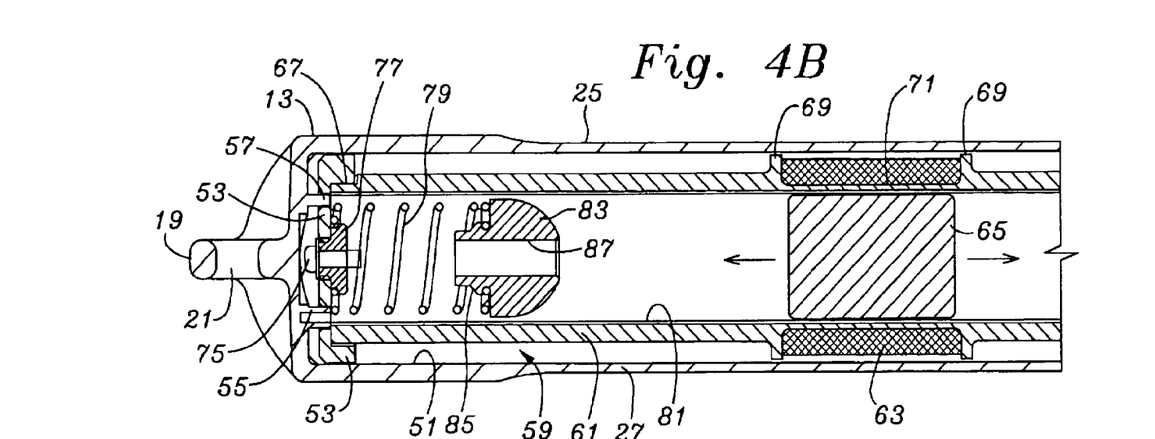

Referring to FIGS. 4A and 4B, expanded views of a sectional view taken along line 4A and 4B of FIG. 2 are shown. Beginning at the end of the main housing chamber 13 closest the protruding lug 19, and adjacent an internal surface 51 of the main housing chamber 13, a centering sleeve 53 is supported by projections 55 and 57. The centering sleeve 53 supports a magnet wire and magnet support assembly 59 which includes a magnet translation support sleeve 61 supporting 1600 turns of magnet wire 63 at a position approximate the center of travel of a magnet 65 which is mounted to freely axially slidably move within the magnet translation support sleeve 61. The term "magnet wire" is utilized only to indicate that this wire is intended to have induced currents due to the movement of a magnet.

The end of magnet translation support sleeve 61 nearest the centering sleeve 53 includes a circumferentially outwardly directed groove 67 to enable it to fit within and be seated against the centering sleeve 53. Near the center of the magnet translation support sleeve 61, a pair of spaced apart lands 69 are provided to both stabilize the magnet translation support sleeve 61 against the internal surface 51 of the main housing chamber 13, and to provide a defined annularly radial volume for the magnet wire 63. In the case shown in FIG. 4B, this volume includes a portion of the external surface of magnet translation support sleeve 61 shown with numeral 71 which has a smaller cylindrical radius to accommodate slightly more volume of the magnet wire 63, but this need not be the case in every design.

At a portion of the magnet translation support sleeve 61 opposite the circumferentially outwardly directed groove 67, a radial land 73 is provided for stabilizing the magnet translation support sleeve 61 against the internal surface 51 of the main housing chamber 13.

Within and near the end of the magnet translation support sleeve 61 near the centering sleeve 53 a screw 75 secures a spring retainer 77 to the centering sleeve 53. The spring retainer 77 further secures a rear spring 79, at a first end of rear spring 79, and within the magnet translation support sleeve 61, preferably in a manner that it will not contact or rub against an inner surface 81 of the magnet translation support sleeve 61. A second end of the spring 79 is attached to a damper 83 by its rearwardly extending boss 85 around a central bore 87.

Within and near the end of the magnet translation support sleeve 61 near the radial land 73 a screw 75 secures a spring retainer 77 to an end wall 89 of the magnet translation support sleeve 61. The spring retainer 77 further secures a front spring 91, at a first end of front spring 91, and within the magnet translation support sleeve 61, also preferably in a manner that it will not contact or rub against an inner surface 81 of the magnet translation support sleeve 61. A second end of the front spring 91 is attached to a second damper 83 by its rearwardly extending boss 85 around a central bore 87.

As is further shown, the magnet translation support sleeve 61 is not seen to end at the radial land 73, but continues with a web portion 95 leading to a support 97 for supporting a gold capacitor 101 which may preferably be commercially available from Panasonic EECF5R5U105 and may have a value of up to one farad and is limited only by the limitations desired for energy storage capacity. Gold Capacitor 101 provides the energy storage for powering the flashlight 11. Support 97 may continue with a wall 103, as well as a wall which would be present to obstruct the view of FIG. 4A, but which is removed in order to see the sectional view of FIG. 4A. A divider 105 is seen located over the gold capacitor 101. Above the divider 105 a reed switch bracket 107 supports one or more lengths of tape 109 for spacing a reed switch 111. The reed switch 111 is underneath a position occupied by the forward most translation of slide member 35. A small magnet 115 is shown within the slide member 35 and in a position over and just to the side of the reed switch 111. Small magnet 115 is utilized to cause the reed switch 111 to close when the slide 35 is in its forward position. FIG. 4A also illustrates the depth of an external indentation 117 in the main housing chamber 13 which accommodates the small magnet underneath the slide 35 which translates within the attached saddle 33. When the slide 35 and small magnet 115 are brought rearwardly within the saddle 33 and away from the reed switch 111, the reed switch 111 will open to interrupt any lighting circuit present.

Forward of the support 97, a further support 121 connects the support 97 to a reflector housing 123. At the rear of the reflector housing a light emitting diode 125 may be connected to circuitry 126. Circuitry 126 will provide rectification of the alternating currents produced with the magnet wire 63 and magnet 65 for each travel length of the magnet 65. Light emitting diode 125 is concentrically mounted within the reflector housing 123 and surrounded by a reflector material 127. The inner cylindrical surface of reflector housing 123 may also be reflectorized. Just ahead of the reflector housing 123, the internal surface 51 of the main housing chamber includes a groove 131 which is concentrically larger than internal surface 51. Groove 131 has a radial surface width to fit an "o" ring 135. Groove 131 has an axial depth to accommodate both the "o" ring 135 and about half the thickness of the lens 47. The lens 47 is forced in place by the rearward projection of a butt end 137 of the inner cylindrical member 139 of which the inner cylindrical surface 45 was previously seen. As also can be seen, a mating space 141 is immediately adjacent the lens 47 and between the main housing chamber 13 and the front cap 15. The mating space 141 leads to a threaded interface including an outer set of threads 143 on the main housing chamber 13 and an inner set of threads 145 on the front cap 15. The other side of the threaded interface is in communication with the dividing line 17.

Note that any moisture or water must gain admittance in one of two paths. One path is through the dividing line 17, thence through the threaded interface between outer set of threads 143 and inner set of threads 145 on the front cap 15 and to the edge of the lens 47. The other path is between the outer periphery of the front face of the lens 47 and the continuous butt end 137 of the inner cylindrical member 139 of the front cap 15.

In order to enter the inside of the main housing chamber 13, moisture must either go past the sealed barrier between the "o" ring 135 and the groove 131, or between the "o" ring 135 and the periphery of a rear face 147 of the lens 47.

First, it is clear that the flashlight 111 can be provided with varying capacity members. For example, the magnet 65 has been found to work well utilizing a diameter size of about nineteen millimeters and a length of about 28 millimeters. The field strength of the magnet 65 will depend upon the material used. Variations might include the use of two magnets 65 separated by a plastic interconnect. In this configuration, the magnets would excite the magnet wire 63 twice for each tilt of the main housing chamber 13. Ideally, the pair of magnets 65 could be reverse polarized so that one tilt would be equivalent to two tilts with one magnet. Three or four magnets could be joined together to give four actuations of the magnet wire 63 for each tilt of the flashlight 11.

Conversely, multiple numbers of sections of the magnet wire 63 could be provided. Two sections of magnet wire 63 would produce twice the energy per tilt or travel of the magnet 65 from one end of the magnet translation support sleeve 61 to the other. Again, the strength of the springs 79 and 91, combined with the hardness of the dampers 83 and the weight of the magnet 65 (or magnets 65) will determine the natural frequency of shaking for activation of the flashlight 11. Further, where the magnet translation support sleeve 61 is made from nearly frictionless material and where the magnets 65 are made from a material complementary to the frictionless material of the magnet translation support sleeve 61, very little energy from friction will be consumed and the bulk of the reverse magnetic EMF force will predominate as resistance to shaking the flashlight 11. Insofar as any resistance from air entrapment within the magnet translation support sleeve 61, this can be vitiated by providing alternative routes for air to pass. Alternate routes can be accomplished by providing a core in the magnet 65, or by providing side slots along the side edges of magnet 65, or by providing long ribs along the inside of the magnet translation support sleeve 61 to provide a reduced surface wear area as well as spacing for displacement air to pass, or the magnet translation support sleeve 61 itself could be provided with ventilation holes to allow air to pass in the space between the an outer surface 149 of magnet translation support sleeve 61 and internal surface 51 of the main housing chamber 13, for example.

Given the fact that the stored energy in the flashlight 11 is accomplished with a high efficiency gold capacitor 101, the storage capability of the gold capacitor can be enlarged by utilizing either more capacitors 101 in parallel, or a larger capacitor 101. Unlike storage batteries, a capacitor 101 will not suffer deleterious effects from being charged for long periods of time. Capacitors may have some leakage or some rating based upon inadvertent leakage, but regardless of this factor, there is no negative effects from keeping a constant charge. As such, the flashlight 11 is ideal for storage in a horizontal position in locations subject to movement. For example, storage under the seat of a truck laterally will result in movement of the magnet 65 from one end of the magnet translation support sleeve 61 each time an alternative corner is turned. In more specialized structures, such as upon surfaces that turn slowly, the mounting of the flashlight 11 will provide a continuous charge. In machinery which undergoes significant shaking in a predominant direction, the flashlight 11 could also be mounted. The mounting method may vary, but any mounting external magnets should be located away from both the path of travel of the magnet 65. In all of these cases, the flashlight 11 will automatically be available for use in a fully charged condition.

Utilizing the structures described, it is expected that the resulting flashlight 11 could be manually shaken back and forth at approximately one movement per half second, for a total 90 seconds to make enough energy to power the light emitting diode 125 for about 5 minutes. The light output is preferably and deliberately low at about 6000 lux in order that the cycle time enable a user to have the ability "stay ahead" of the energy utilization time. In the example of a ninety second shake for about five minutes of illumination, and depending upon the capacity of the components, it will be preferable to perform the shaking at a time when the light emitting diode 125 is switched off via the switch assembly 31. In emergency circumstances, the user who performs shaking with the light emitting diode 125 on, will experience a lesser cycle time and a jumpy light show. If the components were set to a vigorous ninety second shake followed by five minutes of operation, if the shaking occurred while the flashlight 11 was on, the five minutes would be reduced to about three and a half minutes.

Figure 5:
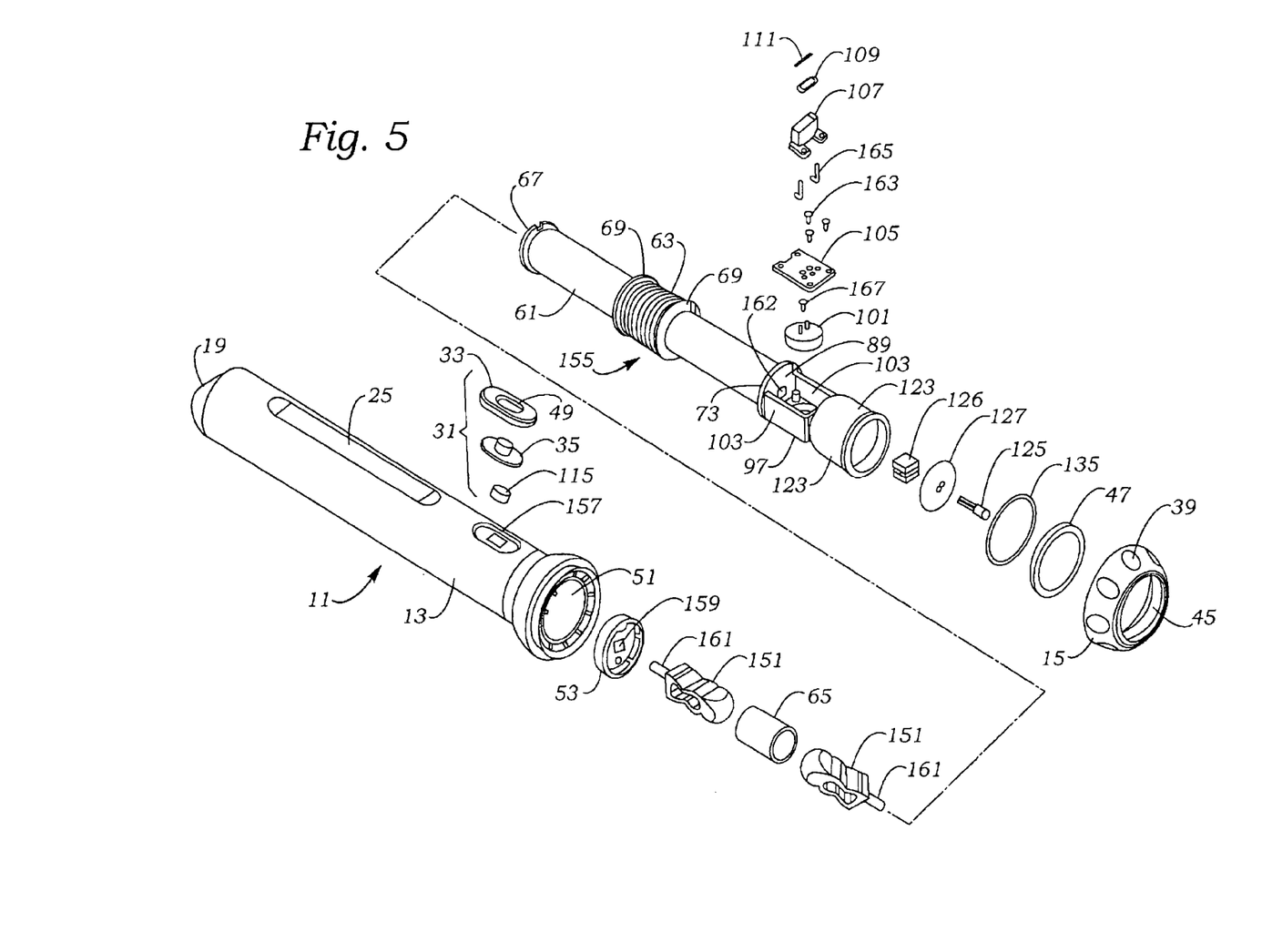
FIG. 5 illustrates an exploded view of a further embodiment utilizing lateral pinch dampers to protect the casing from magnet force movement.

Referring to FIG. 5, an exploded view of a further embodiment of the invention illustrates further internal details as well as the presence of a unitary body pinch flexure damper 151. Also can be seen is a perspective view of an integrated internal support system 155 including the magnet wire and magnet support assembly 59, web portion 95, support 97 forming a semi enclosed circuits area, and attached reflector housing 123.

The integrated internal support system 155 forms a stable support structure which can be securely fixed within the main housing chamber 13 and which will stabilize and support the internals during the shaking operation. Because the system 155 extends essentially the length of the housing 13, its implacement to bear against the rear of the housing 13 at its rear end, and the front of the housing by virtue of the pressure of the cap 15 when engaged on the front of the housing 13.

Further details are seen beginning at the upper left side of the drawing. The saddle 33 is seen to include the slide space 49 through which the slide member 35 can axially translate. Small magnet 115 is seen as fitting under a matching space in the slide member 35. As a result, a matching space 157 need only have a defined separation from the reed switch 111.

The space 157 need not be present, as the saddle 33 can be curved to fit on a cylindrical housing, but the use of a space 157 enables better control of the assembly process. The centering sleeve 57 is formed as a cover and has a central opening or aperture 159 to accommodate an anchor 161 of the unitary body pinch flexure damper 151. Loading the damper 151 is as easy as threading the anchor 161 through the central opening to anchor it by friction or by adhesive or glue against the sleeve 57. Inasmuch as the whole of the system 155 is under a stabilizing compression, the sleeve 57 and damper 151 will not tend to dislodge itself from its connection with the sleeve 57.

An aperture 163 in the end wall 89 will accommodate the other anchor 161 of the other pinch flexure damper 151. Once the anchor 161 is threaded through the aperture 159 or 163 in either the sleeve 57 or the end wall 89, the anchor 161 may be trimmed or clipped as is necessary to provide any clearance for objects with which the anchor 161 would otherwise interfere. Also seen are screws 163 which are used to hold the reed switch bracket 107 against a set of bare wires 165 which extend upward from the circuit board divider 105. Another screw 167 is used to secure the gold capacitor 101 to the circuit boar divider 105. All of the electronics fit within a box opening including the pair of oppositely spaced walls 103 and underlying support 97.

Figure 6:
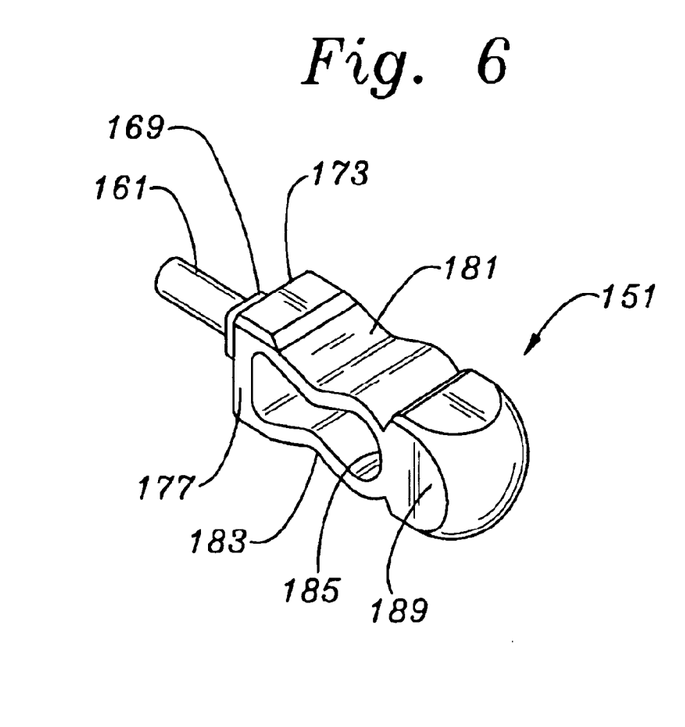
FIG. 6 is a perspective view of a unitary body pinch flexure damper utilized to dampen the impact of a sliding magnet.
Figure 7:
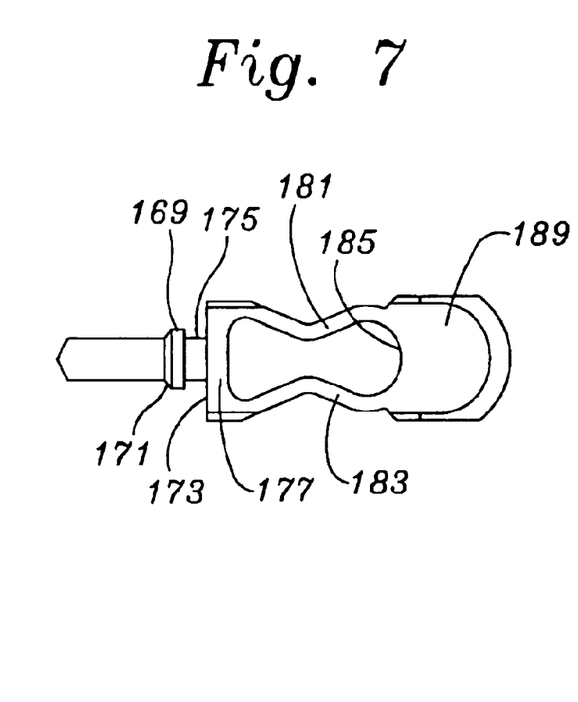
FIG. 7 is a side view of the damper shown in FIG. 6.

Referring to FIGS. 6 and 7, a perspective and a side view of the unitary body pinch flexure damper 151 illustrates further details thereof. The anchor 161 may include a land 169 having a conic surface 171 and spaced apart from a base surface 173 of the damper 151. A portion of the anchor 175 exists between the land 169 and the base surface 173 which will enable capture of the structures around the apertures 159 and 161 to help stabilize the damper 151. The extent of the anchor 161 beyond the land 169 can be trimmed after installation if there is an interference problem. The main extent of the anchor 161 is to facilitate manual threading through apertures 159 and 161, and tension to pull the land 169 through.

Base surface 173 is part of a base 177. A pair of hourglass shaped or angled side walls 181 and 183 extend from the base 177. Each of the side walls curves gently toward each other for about half of their length and then back to form a top internal curve 185. The curve 185 sits below a rounded solid end member 189.

The shaped, opposing nature of the side walls 181 and 183 insure that any axial compressive force borne between the solid end member 189 and the base 177 will result in the side walls 181 and 183 bending toward each other at their mid points. The first stage of deformation will occur as the side walls 181 and 183 bend about their mid sections with the mid sections of the side walls 181 and 183 being driven toward each other. The second stage of deformation will occur once the mid sections of side walls 181 and 183 have made contact, with the second stage of deformation resulting in the increase in surface area contact of the mid sections of the side walls 181 and 183 with each other.

The first stage of deformation slows the movement of the magnet 65 less rapidly than the second stage of deformation. Because of the dampening action, no spring return force action is had with respect to the magnet 65. This effect is due to the mass of the magnet which is about even with the mass of the remainder of the flashlight 11. The mass amounts are such that a typical user's movements significantly move the flashlight back and forth and the path of travel of the magnet 65 is significantly shortened by movement of the flashlight 11 depending upon the severity and frequency with which it is shaken. The main action of the dampers 151 is to prevent the magnet 65 from making hard impact against the structure of the magnet wire and magnet support assembly 59, especially where the flashlight 11 is shaken severely. Damping may also be aided by the clearance between the magnet 65 and the inner surface 81 of the magnet translation support sleeve 61.

The advantages of the flashlight 11 are clear in that a user can have a flashlight available for emergency use or backup use and which does not need batteries. The sealed unit of the flashlight 11 can be left idle for decades and then pressed into use. Because a capacitor 101 is used for energy storage and because capacitors, especially high efficiency (charge per unit weight) capacitors will typically drain its charge. As a result, a user who typically stores the flashlight 11 in a secure location must find and shake the flashlight 11 to energize it before it is ready to use.

Further disclosed herein are ways of charging capacitor 101 which better enable the flashlight 11 to be used as an emergency light. Many emergency lights left in charging position for long periods of time fail because the storage cell typically used in such flashlights has either corroded, or failed because of being required to hold a charge for a long period of time. Where the charger is co-located with a conventional flashlight, the heat from the charger can damage the battery.

The flashlight 11 is amenable for use with a charging coil which can charge the capacitor 101 through electromagnetic force energy received through the flashlight 11 main housing chamber 13. The charger can be constructed in a variety of configurations to enable a high variety of support structures. In addition to an overlying sleeve, any housing which contains a coil or can transmit a magnetic field which can induce current in the magnet wire 63 will act to keep the capacitor 101 charged. This will enable a user to keep the flashlight 11 as a quick ready emergency flashlight which is instantly available from its charger. With an emergency which is associated with power failure, the flashlight 11 is ready to go and need only be shaken to supplement current which is used since retrieval from the charger.

Figure 8:
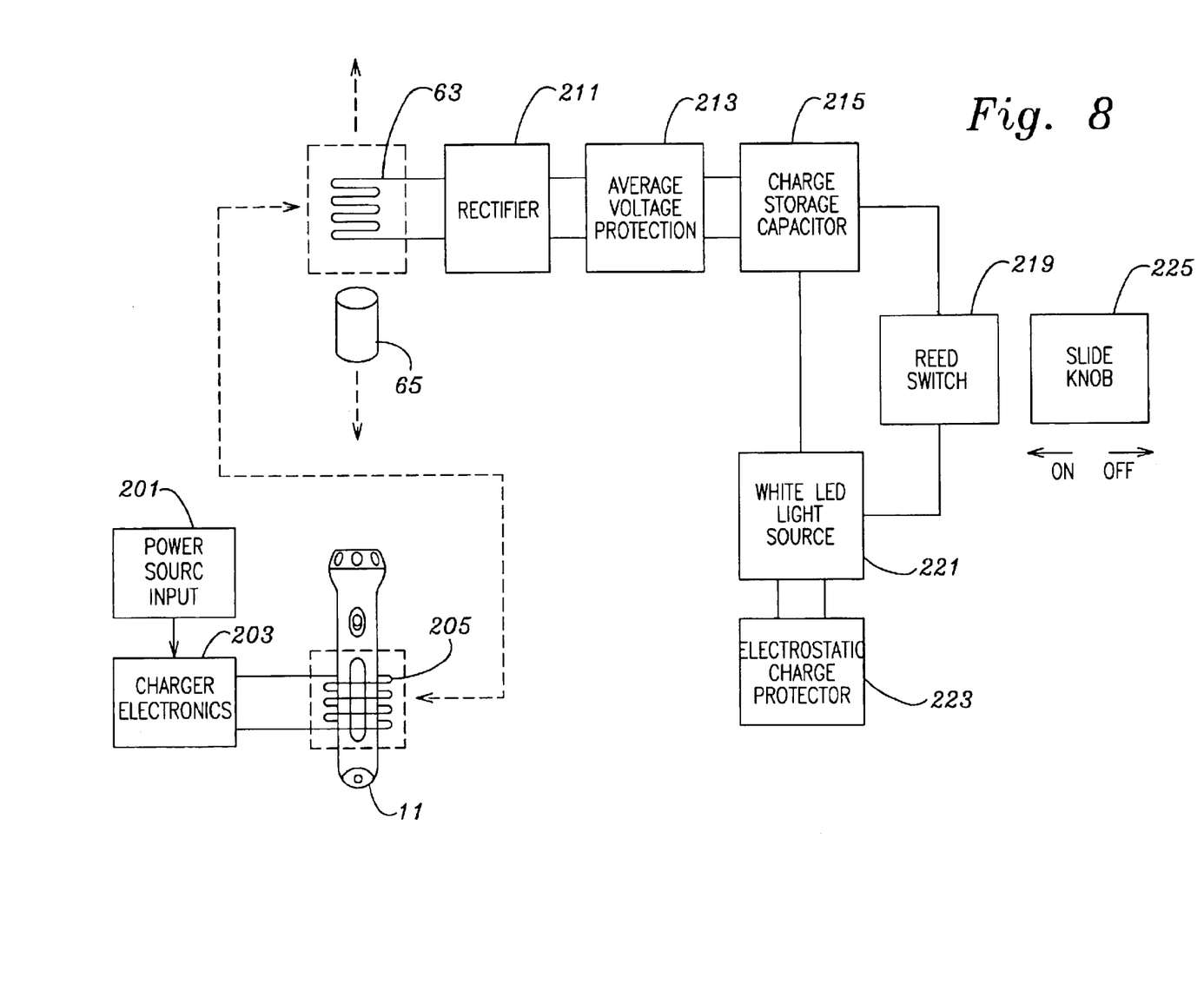
FIG. 8 illustrates a block diagram of one of the field chargers shown in conjunction with the elements of the flashlight and its magnet.

Referring to FIG. 8, a block diagram illustrating the charger and its relationship with the overall flashlight 11 circuitry is shown. A POWER SOURCE INPUT line input block 201 is seen supplying power to CHARGER ELECTRONICS block 203. The POWER SOURCE INPUT line input block 201 can be either an AC line input or a DC input having inverter electronics which will produce an alternating magnetic field. The charger electronics block 203 is connected to a charging coil 205. The flashlight 11 is shown physically within the charging coil 205 to illustrate one manner with which an electromagnetic field can be induced into the magnet wire 63 within the flashlight 11. The remaining portion of FIG. 8, beginning with magnet wire 63, illustrates components associated with flashlight 11.

The charging coil 205 is separated from but in close proximity to a coil of magnet wire 63. Magnet 65 is shown in a position to move through the magnet wire 63. Thus the magnet wire 63 is energized either by movement of magnet 65 or by an alternating electromagnetic field from the charging coil 205.

Magnet wire 63 is connected to a RECTIFIER block 211. RECTIFIER block 211 is connected to an OVER VOLTAGE PROTECTION block 213. The OVER VOLTAGE PROTECTION block 213 is connected to a CHARGE STORAGE CAPACITOR block 215. One of a pair of leads from the CHARGE STORAGE CAPACITOR block 215 is connected in series through a REED SWITCH block 219. The other lead from the a CHARGE STORAGE CAPACITOR block 215 and a lead from the REED SWITCH block 219 is connected to a WHITE (light) LED block 221.

WHITE LED block 221 is connected in parallel to an ELECTROSTATIC CHARGE PROTECTOR block 223. A SLIDE KNOB block 225 is shown adjacent to but separated from the REED SWITCH BLOCK 219. When the SLIDE KNOB block 225, containing small magnet 115 is moved into proximity to the REED SWITCH BLOCK 219, reed switch 111 closes to turn the flashlight 11 on. When the SLIDE KNOB block 225, containing small magnet 115 is moved out of proximity to the REED SWITCH BLOCK 219, reed switch 111 opens to turn the flashlight 11 off.

Figure 9:
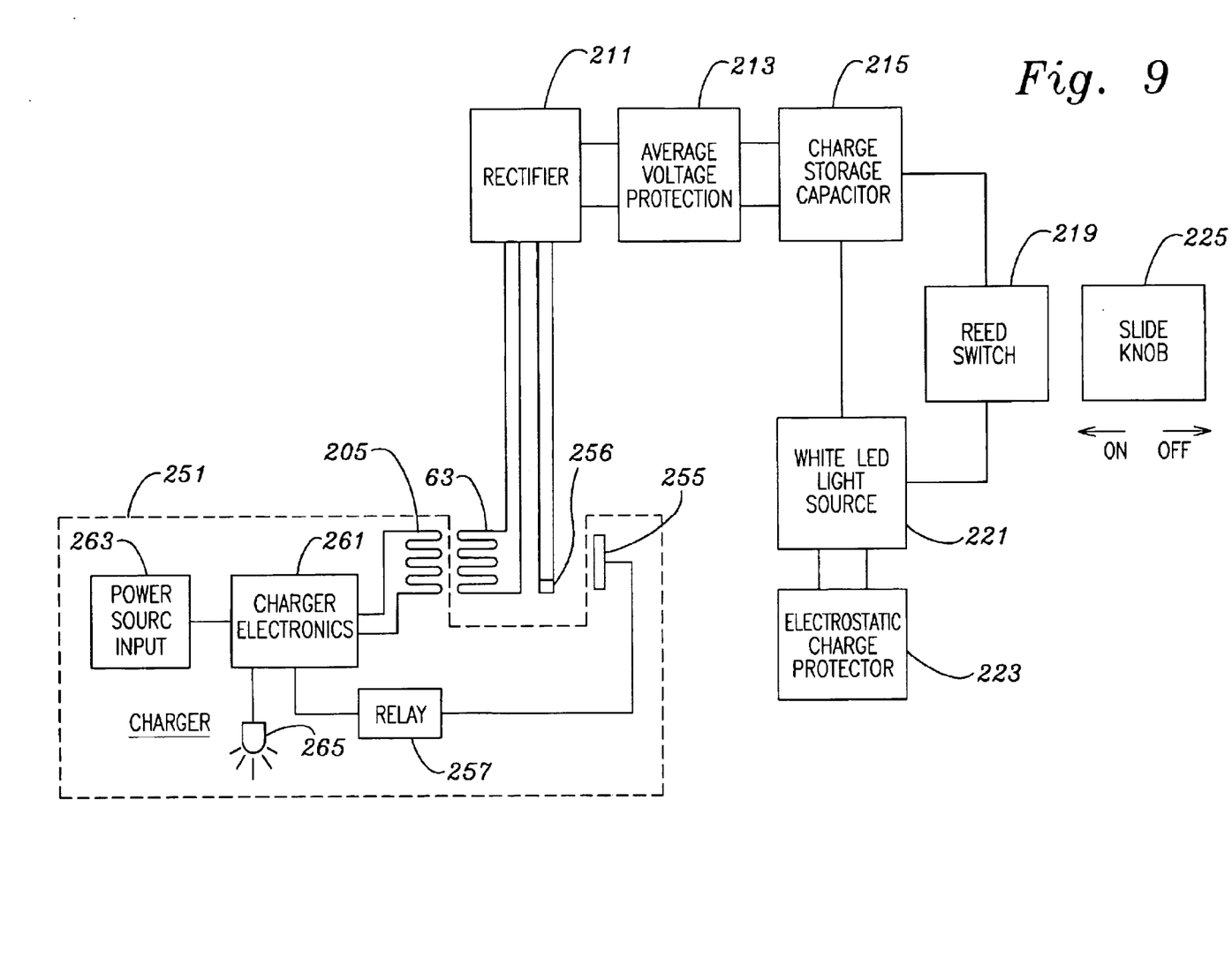
FIG. 9 illustrates a block diagram of another charger shown in conjunction with the elements of the flashlight and an additional induction coil.

Referring to FIG. 9, a schematic illustrating the use of the flashlight 11, shown as a rectangle supported by a charger housing 251 illustrates some support for the flashlight 11 housing 25 or at least some orientational registering of a charger housing 251 with respect to the flashlight 11 charger housing 251. Within the charger housing 251, a switch electro MAGNET block 255 is oriented to a position close to either (1) an auxiliary reed switch 256 which is connected in parallel with the reed switch 111, or (2) directly to the reed switch 111. Either the reed switch 111 or 256, upon energization of the MAGNET block 255 to which the RELAY block 257 is connected, will cause the flashlight 11 to turn on.

Since the switch assembly 31 is located over the reed switch 111, a triggering electromagnet 255 would either cover or obstruct operation of the reed switch 111 and in some cases be affected by the small magnet 115. By making a separate reed switch 256 wired in parallel with reed switch 111 and locating it elsewhere, a user has independent "on" control. A user can switch the flashlight 11 to the "on" position whether or not a power failure has occurred.

In one case, the manual whenever the RELAY block 257 is energized by a CHARGER ELECTRONICS block 261. The CHARGER ELECTRONICS BLOCK 261 is connected to a POWER SOURCE INPUT block 263. Where the POWER SOURCE INPUT block 263 includes both line electrical input and a battery storage, it can switch to battery automatically upon power failure. An optional charger LED 265 can be used to not only indicate the energization of the charger 251 but also to provide some illumination upon power failure where the POWER SOURCE INPUT block 263 includes battery power.

When the power input to the charger 251 fails, the POWER SOURCE INPUT block 263 switches to battery power and either energizes or maintains energization of the charging coil 205. The POWER SOURCE INPUT block 263 then closes or opens the RELAY block 257 to energize or de-energize MAGNET block 255. For maximum power savings, the steps will include opening a reed switch 111 or 256 with de-energization of MAGNET block 255 to enable the reed switch 111 to close by the cessation of a electro-magnet in opposition to a permanent magnet, for example.

In any event, the actuation of RELAY block 257 acts to close the reed switch ill to turn the flashlight 11 on. Preferably the charger 251 will be in a position to lend support to the flashlight 11 and preferably to orient flashlight 11 in a vertically upward orientation. This results in the combination charger 251 and flashlight 111 becoming a power failure light. A home or office equipped with a number of such charger 251 and flashlight 11 combination sets would experience automatic night lighting upon power failure. However, night lights cannot be removed and taken along. In situations where one or two occupants in a dwelling experience a power failure, they can not only have enough light to see, but can go directly to the flashlight 11 and remove it from the charger 251 and use the flashlight 11 to assist in evacuation of the building.

In a business with a number of employees, and equipped with a large number of charger 251 and flashlight 11 combination sets, employees would each have a handy light to assist in evacuation. In both the home and business situations, a long evacuation route could be managed because of the ability to manually add power to the flashlight 11 by shaking. By having a charger 251 to provide constant charging, each of the flashlights 11 would be completely charged and ready to go in the event of a power failure.

Again, the charger 251 can be of any shape which will communicate power to flashlight 11 and of any orientation which will enable actuation of the reed switch 11 upon loss of power. In the alternative, the relay 257 and electrically actuated magnet 255 need not be present for two other alternatives. In a first alternative, the flashlight 11 is maintained in the off position, but under constant charge. In this situation, the user must, upon power failure, find the charger 251 and flashlight 11 combination set in the dark. This is not the optimum situation, but is manageable where the charger 251 and flashlight 11 combination set is kept in an easily reachable location or where the charger carries its own illumination LED 265

A second alternative involves the flashlight 11 being left on permanently. As stated earlier the amount of light from the flashlight 11 is not high where a single white light emitting diode is used. Where the flashlight 11 is to be left on constantly, it will not output a significant amount of light in the daytime to be noticed. At night, the light output will be comparable to a night light. If left on constantly, the flashlight 11 should have a power input sufficient to keep the capacitor fully charged and to equal the amount of light output from the white light LED source 221.

Of course, in the most automated configuration, whenever the flashlight 11 is placed into a pre-determined resting position within the charger housing 251, the charging coil 205 charges the magnet wire 63. The charging coil 205 on the charger may preferably be in vertical position, in close proximity to the charging coil 205 when the flashlight 11 sits in vertical position to the charger 251.

Figures 10, 11:
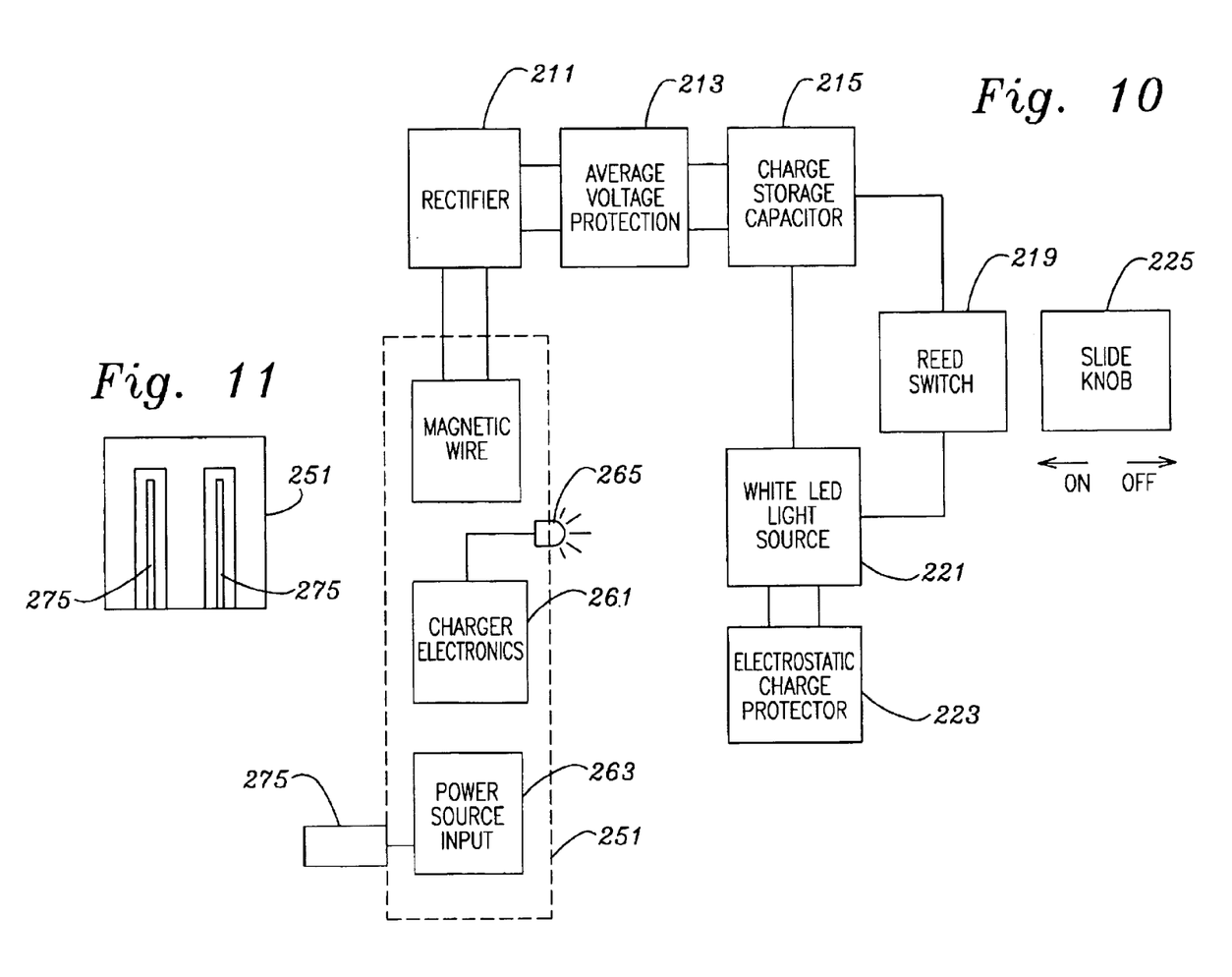
FIG. 10 illustrates a block diagram of another charger in conjunction with the elements of the flashlight and built-in AC wall plug.
FIG. 11 illustrates a front view of a portion of the flashlight housing seen in FIG. 10 and illustrating the folding plug blades shown in stored position.

Referring to FIG. 10, many of the features which are possible in FIGS. 8 and 9 have been combined into a single housing. A retractable AC power plug 275 is located at the lower end of the flashlight 11 housing 25. The plug 275 is sufficient to support the flashlight 11 from a common alternating current outlet. Because the power is made available directly to the flashlight 11 housing 25, the charging coil 205 to magnet wire 65 connection is not necessary.

The power source 263 can be a capacitative power transfer device with a power pickup in the charger electronics 261. Such an arrangement enables the inside of the housing 25 to continue its sealed relationship to the components seen in FIG. 5. Capacitive transfer can be had with a separate line within the main housing chamber 13 connecting directly to the charger electronics 261, or by direct conduction using connector terminals which formed at the time the housing 25 is formed. The seal of the main housing chamber 13 can be maintained by a variety of mechanical means combined with different structure to take power from the power plug 275 to the rectifier.

The other components seen in FIG. 10 are the same as seen in the FIG. 9. In the configuration shown, the flashlight 11 can be manipulated to deploy the blades of the plug 275 to a position for insertion in a wall plug. The modes of operation including (1) detection of loss of input power to then cause illumination of the LED 125, or (2) constantly on as selectable by the user by manipulation of the reed switch 219 and preferably with enough power input capability to keep a full charge under conditions of constant illumination, or (3) constantly off and charging as selectable by the user and preferably assisted with a charging illumination LED 265 to assist location of an off flashlight 11 in the dark and (4) flash the illumination LED 265 in the event of an AC power failure.

Figure 12:
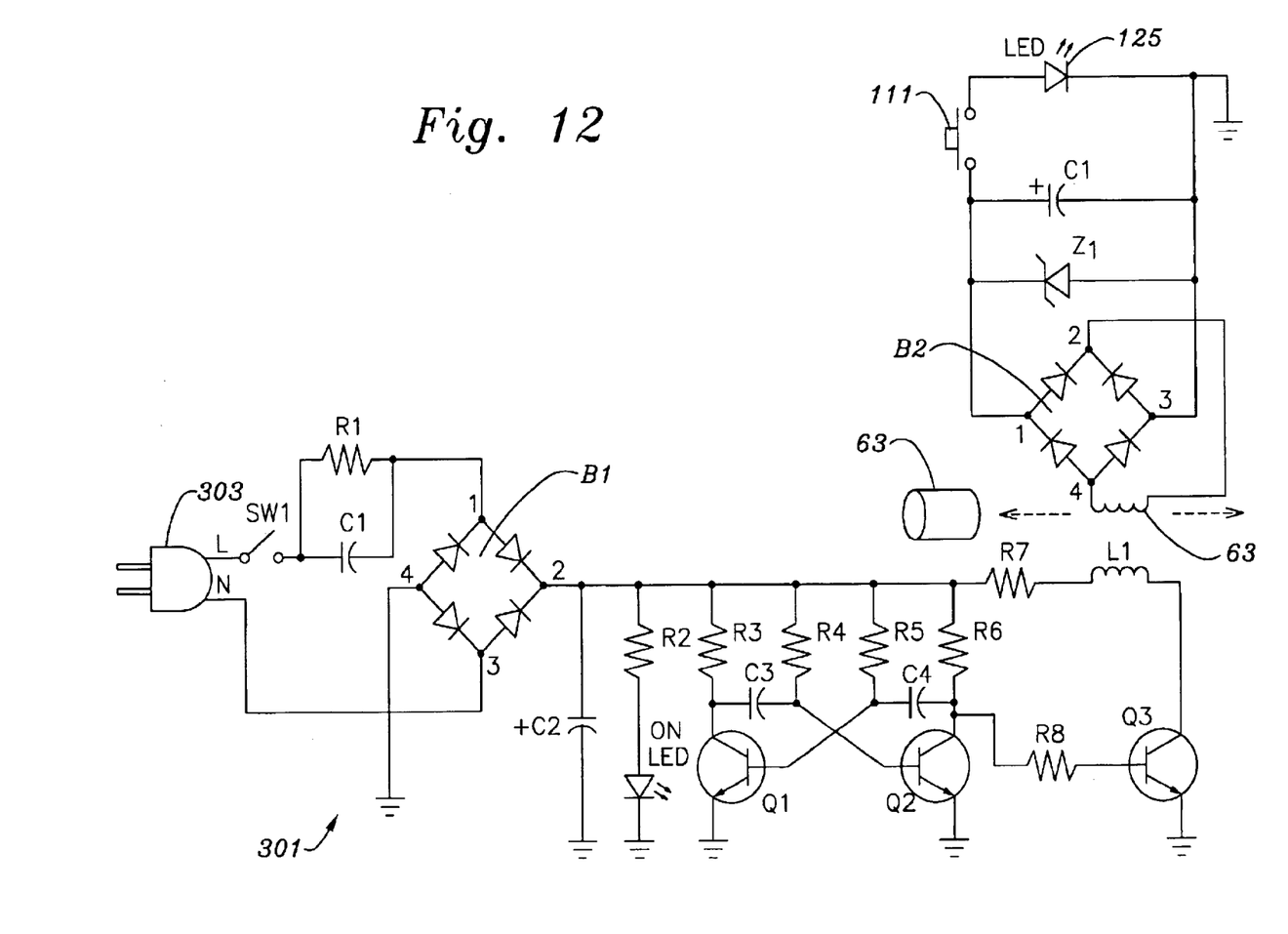
FIG. 12 is a more detailed schematic of the circuitry of both the charger shown in FIG. 8 and the flashlight of the invention.

Referring to FIG. 12, a front view of the housing 25 is shown with the AC power plug 275 seen as a pair of blades folded to a position flush with the housing 25. In this manner, the AC power plug 275 can be deployed for charging and support from a wall outlet, and folded to a stowed position when carried or stored not in charging position.

Referring to FIG. 12 a more detailed schematic is shown. This schematic will illustrate alternating current conversion to a lower frequency field which matches, as much as possible, the natural frequency of the magnet wire 63. The circuitry shown which is downstream of the first rectifier section could be used in conjunction with a direct current power source.

Beginning at the left, a charger circuit 301 includes a plug 303 will take an alternating current input (such as 220 or 110 volt) from a wall socket as is typically found in the home. A switch SW1, connected to the line terminal of plug 303, enables the charger circuit 301 to be turned off without removing the plug 303 from its wall connection. A filter set consisting of a parallel combination of a resistor R1 and a capacitor C1 supplies the filtered AC current to position 1 of diode rectification bridge B1. Position 3 of diode rectification bridge B1 is connected to the other or neutral terminal of the plug 303. Position 4 of the of diode rectification bridge B1 is grounded and position 2 of the of diode rectification bridge B1 forms a main node for the remainder of the connected circuitry of the charger 301.

Position 2 of diode rectification bridge B1 is connected to ground through a capacitor C2 and position 2 of diode rectification bridge B1 is also connected to ground through a series combination of resistor R2 and a light emitting diode ON LED.

Position 2 of diode rectification bridge B1 is connected through a resistor R3 to the collector of a transistor Q1, the emitter of transistor Q1 being grounded. The collector of transistor Q1 is connected through a capacitor C3 to the base of a transistor Q2. Further, position 2 of diode rectification bridge B1, is connected through a resistor R4 to the collector of transistor Q2.

Position 2 of diode rectification bridge B1 is connected through a resistor R6 to the collector of transistor Q2 the emitter of transistor Q2 being grounded. The collector of transistor Q2 is connected through a capacitor C4 to the base of transistor Q1. Further, position 2 of diode rectification bridge B1, is connected through a resistor R5 to the collector of transistor Q2.

The collector of transistor Q2 is connected through a resistor R8 to the base of a transistor Q3, the collector of transistor Q2 the emitter of transistor Q2 being grounded. Further, position 2 of diode rectification bridge B1 is connected through a series combination of a resistor R7 and a coil L1 to the collector of transistor Q3. The coil L1 should have a size and matching characteristic with the coil of magnet wire 63 of the flashlight 11 to obtain maximum power transfer characteristic.

Also seen, and shown somewhat schematically for orientation purposes, is the coil of magnet wire 63 and the charging magnet 65 which passes through it. The coil L1 and coil of magnet wire 63 are enabled to be placed into a physical proximity such that energization of coil L1 will energize the coil of magnet wire 63. Structures which may accomplish this include providing a larger coil L1 into which the flashlight 11 housing 13 may fit, or some such other compatible structure.

Continuing with the circuitry for the flashlight 11, the coil of magnet wire 63 is connected to positions 2 and 4 of a diode rectification bridge B2. Positions 1 and 3 of diode rectification bridge B2 are connected through a parallel combination of a 5.1 volt zener diode Z1, and a capacitor C5 which is shown as capacitor 101 in the other views. Positions 1 and 3 of diode rectification bridge B2 are connected through a series combination of reed switch 111 and illumination LED 125, both of which were seen in the previous drawings.

TABLE 1

| Circuit Values | |
| --- | --- |
| R1 | 1 Mega ohm |
| R2 | 3 k ohms |
| R3, R6 | 2.7 k ohms |
| R4, R5 | 47 k ohms |
| R7 | 12 k ohms |
| R8 | 2 k ohms |
| C1 | 0.22 pF |
| C2 | 22 µF |
| C3, C4 | 392 µF |
| C5 | 1 F, 5.5 volt |
| Q1, Q2 | 9014C |
| B1 | 1N4001 |
| B2 | 1N4004 |
| Illum.LED | NSPW500BS |

While the present invention has been described in terms of a flash light not needing incandescent bulbs or batteries, its charging system to permit quick emergency light use, and more particularly to particular structures which are both sealed and manually powered lighting device, the principles contained therein are applicable to other instruments, devices, processes and structures in which sealed, water proof, and underwater lighting can be provided.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. A self contained, manually energizable flashlight comprising:

a magnet having a magnetic field;

an annularly cylindrical main housing having an opening;

a lens;

a cap attached to and for closing said lens against said annularly cylindrical main housing;

a support system sleeve having a first end and a second end, for supporting a translating movement of said magnet toward said first end and toward said second end of said support system said support system for quick insertion into and dimensioned sealed carriage into said main housing, said support system sleeve for bearing against said lens upon closure of said lens against said annularly cylindrical main housing;

a magnet wire positioned such that said magnet passes by said magnet wire each time said magnet makes said translating movement of said magnet toward said first end and toward said second end of said support system sleeve, energizing said magnet wire from passage of said magnetic field through said magnet wire upon said translating movement of said magnet;

a capacitor for storing an electrical charge;

a light emitting diode;

circuitry connected to said capacitor, said light emitting diode and to said magnet wire for converting said energization of said magnet wire into an electrical charge stored in said capacitor and for providing said electrical charge stored in said capacitor to power said light emitting diode.

2. The flashlight as recited in claim 1 wherein said support system sleeve supports said magnet wire.

3. The flashlight as recited in claim 2 wherein said magnet wire is coiled around said support system sleeve.

4. The flashlight as recited in claim 1 wherein said cap forms an air tight seal with respect to said main housing.

5. The flashlight as recited in claim 1 wherein said annularly cylindrical main chamber has a groove adjacent said opening and further comprising an "o" ring forming a seal between said groove and said cap.

6. The flashlight as recited in claim 1 and further comprising a walled support for supporting said light emitting diode and said circuitry and connected to said support system sleeve.

7. The flashlight as recited in claim 1 and further comprising a switch interposed between said connection of said capacitor and said light emitting diode for controllably controlling the energization of said light emitting diode.

8. A self contained, manually energizable flashlight comprising:

a magnet having a magnetic field;

an annularly cylindrical main housing having an opening, an outwardly disposed thread adjacent said opening;

a cap, and wherein said cap is a front cap and wherein said front cap further comprises:

a threaded structure having a central opening about an inwardly directed cylindrical surface terminating at a circular butt end, and having an inwardly disposed thread complementary to said outwardly disposed thread; and a front transparent light transmissive material adjacent said central opening and interposed between said circular butt end and said "o" ring supported by said groove adjacent said opening, said cap for closing said front transparent light transmissive material against said annularly cylindrical main housing;

a support system sleeve having a first end and a second end, for supporting a translating movement of said magnet toward said first end and toward said second end of said support system said support system for quick insertion into and dimensioned sealed carriage into said main housing, said support system sleeve for bearing against said lens upon closure of said lens against said annularly cylindrical main housing;

a magnet wire positioned such that said magnet passes by said magnet wire each time said magnet makes said translating movement of said magnet toward said first end and toward said second end of said support system sleeve, energizing said magnet wire from passage of said magnetic field through said magnet wire upon said translating movement of said magnet;

a capacitor for storing an electrical charge;

a light emitting diode;

circuitry connected to said capacitor said light emitting diode and to said magnet wire for converting said energization of said magnet wire into an electrical charge stored in said capacitor and for providing said electrical charge stored in said capacitor to power said light emitting diode.

9. The flashlight as recited in claim 8 wherein said front transparent light transmissive material is a lens for directing a set of light rays from said light emitting diode.

10. The flashlight as recited in claim 8 and further comprising a walled support for supporting said light emitting diode and said circuitry and connected to said support system sleeve.

11. The flashlight as recited in claim 8 and further comprising a switch interposed between said connection of said capacitor and said light emitting diode for controllably controlling the energization of said light emitting diode.

12. A self contained, manually energizable flashlight comprising:

a magnet having a magnetic field;

an annularly cylindrical main housing having an opening and an outwardly disposed thread adjacent said opening;

a front can attached to and for closing said annularly cylindrical main housing and wherein said front cap further comprises:

a threaded structure having a central opening about an inwardly directed cylindrical surface terminating at a circular butt end, and having an inwardly disposed thread complementary to said outwardly disposed thread; and a front transparent light transmissive material adjacent said central opening and interposed between said circular butt end and said "o" ring supported by said groove adjacent said opening;

a support system sleeve having a first end and a second end, for supporting a translating movement of said magnet toward said first end and toward said second end of said support system said support system for quick insertion into and dimensioned sealed carriage into said main housing;

a magnet wire positioned such that said magnet passes by said magnet wire each time said magnet makes said translating movement of said magnet toward said first end and toward said second end of said support system sleeve, energizing said magnet wire from passage of said magnetic field through said magnet wire upon said translating movement of said magnet;

a capacitor for storing an electrical charge;

a light emitting diode;

circuitry connected to said capacitor, said light emitting diode and to said magnet wire for converting said energization of said magnet wire into an electrical charge stored in said capacitor and for providing said electrical charge stored in said capacitor to power said light emitting diode;

a walled support for supporting said light emitting diode and said circuitry and connected to said support system sleeve; and a reflector housing for supporting said light emitting diode and said circuitry and connected to said walled support, such that said reflector housing, said walled support and said support system sleeve are of known length and axially fixed and supported within said main housing and secured at least indirectly by said front cap.

13. A self contained, manually energizable flashlight comprising:

a magnet having a magnetic field;

a main housing;

a support system sleeve having a first end and a second end, for supporting a translating movement of said magnet toward said first end and toward said second end of said support system said support system for quick insertion into and dimensioned sealed carriage into said main housing;

a magnet wire positioned such that said magnet passes by said magnet wire each time said magnet makes said translating movement of said magnet toward said first end and toward said second end of said support system sleeve, energizing said magnet wire from passage of said magnetic field through said magnet wire upon said translating movement of said magnet;

a capacitor for storing an electrical charge;

a light emitting diode;

circuitry connected to said capacitor, said light emitting diode and to said magnet wire for converting said energization of said magnet wire into an electrical charge stored in said capacitor and for providing said electrical charge stored in said capacitor to power said light emitting diode; and a charging circuit having at least one of a direct current and alternating current input and an output charging coil output in physical proximity to a separate induction coil for providing charging electromotive force to said capacitor from outside said main housing.

14. The flashlight as recited in claim 13 wherein said charging circuit includes means for initiating the illumination of said light emitting diode upon loss of power to said charging circuit.

15. A self contained, manually energizable flashlight comprising:
- a magnet having a magnetic field;
- a main housing;
- a support system sleeve having a first end and a second end, for supporting a translating movement of said magnet toward said first end and toward said second end of said support system said support system for quick insertion into and dimensioned sealed carriage into said main housing;
- a magnet wire positioned such that said magnet passes by said magnet wire each time said magnet makes said translating movement of said magnet toward said first end and toward said second end of said support system sleeve, energizing said magnet wire from passage of said magnetic field through said magnet wire upon said translating movement of said magnet;
- a capacitor for storing an electrical charge;
- a light emitting diode;
- circuitry connected to said capacitor, said light emitting diode and to said magnet wire for converting said energization of said magnet wire into an electrical charge stored in said capacitor and for providing said electrical charge stored in said capacitor to power said light emitting diode; and
- a charging circuit having a direct alternating current input from wall AC outlet for providing charging electromotive force to said capacitor from outside said main housing.

16. A self contained, manually energizable flashlight comprising:
- a magnet having a magnetic field;
- a main housing;
- a support system sleeve having a first end and a second end, for supporting a translating movement of said magnet toward said first end and toward said second end of said support system said support system for quick insertion into and dimensioned sealed carriage into said main housing;
- a magnet wire positioned such that said magnet passes by said magnet wire each time said magnet makes said translating movement of said magnet toward said first end and toward said second end of said support system sleeve, energizing said magnet wire from passage of said magnetic field through said magnet wire upon said translating movement of said magnet;
- a capacitor for storing an electrical charge;
- a light emitting diode;
- circuitry connected to said capacitor, said light emitting diode and to said magnet wire for converting said energization of said magnet wire into an electrical charge stored in said capacitor and for providing said electrical charge stored in said capacitor to power said light emitting diode; and
- a charging circuit having at least one of a direct current and alternating current input and an output charging coil output in physical proximity to said magnet wire for providing charging electromotive force to said magnet wire from outside said main housing.

17. A self contained, manually energizable flashlight comprising:
- a magnet having a magnetic field;
- a main housing;
- a support system sleeve having a first end and a second end, for supporting a translating movement of said magnet toward said first end and toward said second end of said support system said support system for quick insertion into and dimensioned sealed carriage into said main housing;
- a magnet wire positioned such that said magnet passes by said magnet wire each time said magnet makes said translating movement of said magnet toward said first end and toward said second end of said support system sleeve, energizing said magnet wire from passage of said magnetic field through said magnet wire upon said translating movement of said magnet;
- a capacitor for storing an electrical charge;
- a light emitting diode;
- circuitry connected to said capacitor, said light emitting diode and to said magnet wire for converting said energization of said magnet wire into an electrical charge stored in said capacitor and for providing said electrical charge stored in said capacitor to power said light emitting diode; and
- a pair of dampers including a first damper located inside and at said first end of said support system sleeve and a second damper located inside and at said second end of said support system sleeve, for dampening the impact resulting from a translating movement of said magnet toward said first end and toward said second end of said support system.

18. The flashlight as recited in claim 17 wherein each damper further comprises a base member having a first side and a second side and having a first angled side wall having a first end extending from said first side of said base member, and having a second end, and having a second angled side wall having a first end extending from said first side of said base member, and having a second end, and a solid member connected at said second ends of said first and second side walls.

19. The flashlight as recited in claim 18 wherein said first and said second side walls are angled to bend toward each other in pinch flexure upon application of axial compressive force between said base member and said solid member.

20. The flashlight as recited in claim 17 and further comprising a walled support for supporting said light emitting diode and said circuitry and connected to said support system sleeve.

21. The flashlight as recited in claim 17 and further comprising a switch interposed between said connection of said capacitor and said light emitting diode for controllably controlling the energization of said light emitting diode.

22. The flashlight as recited in claim 21 wherein said switch interposed between said connection of said capacitor and said light emitting diode is a reed switch operated by a small switching magnet on an outside of said main housing.

* * * * *

(12) EX PARTE REEXAMINATION CERTIFICATE (7260th)
United States Patent
Mah (10) Number: US 6,808,288 C1
(45) Certificate Issued: Dec. 22, 2009

(54) FARADAY FLASHLIGHT

(75) Inventor: Pat Y. Mah, Hong Kong (CN)

(73) Assignee: Cricket Holdings Far East Limited, Wanchai (HK)

Reexamination Request:
No. 90/008,980, Feb. 19, 2008

Reexamination Certificate for:
Patent No.: 6,808,288
Issued: Oct. 26, 2004
Appl. No.: 10/392,657
Filed: Mar. 19, 2003

Related U.S. Application Data

(63) Continuation-in-part of application No. 10/112,848, filed on Mar. 29, 2002, now Pat. No. 6,729,744.

(51) Int. Cl.
*F21L 13/00* (2006.01)
*F21L 13/06* (2006.01)
*H02K 35/00* (2006.01)
*H02K 35/02* (2006.01)

(52) U.S. Cl. ........................... 362/192; 362/205
(58) Field of Classification Search .......... None
See application file for complete search history.

(56) References Cited

U.S. PATENT DOCUMENTS

| | | | |
|---|---|---|---|
| 2,312,670 A | 3/1943 | Olds | |
| 3,777,046 A * | 12/1973 | Schiavone | 174/42 |
| 4,140,932 A | 2/1979 | Wohlert | |
| 5,678,921 A | 10/1997 | Kish et al. | |
| 5,818,132 A | 10/1998 | Konotchick | |
| 5,975,714 A | 11/1999 | Vetorino et al. | |
| 6,808,288 B2 | 10/2004 | Mah | |

* cited by examiner

*Primary Examiner*—Anjan K. Deb (57) ABSTRACT

A light generating flashlight system device utilizes a large centrally located magnet which is mounted to slide past a magnet pickup or current induction wire which may be preferably mounted at a center point of travel in a tubular housing having a tubular chamber through which the magnet travels. A pair of elastomeric dampers are located each at the end of a support system sleeve which is sized to fit within a main housing to stabilize all internal support within a sealed unit. The result is a device which both facilities the manual movement of the flashlight body so that the magnet slides past the center magnet pickup or current induction wire, and also conserves the residual momentum of the magnet once it has traveled past the magnet pickup or current induction wire by providing a bumper and spring to conserve some of the mechanical energy going in the other direction. Ninety second of manual activation enables about five minutes of illumination. A ready charger is disclosed which uses induction to charge the flashlight system by proximity to the manual charging magnet wire.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 18 and 19 is confirmed.

Claims 17 and 20–22 are cancelled.

Claims 1–16 were not reexamined.

\* \* \* \* \*